United States Patent [19]

Kaster

[11] Patent Number: 4,801,053
[45] Date of Patent: Jan. 31, 1989

[54] VALVED DISPENSING SPOUT

[76] Inventor: Eugene J. Kaster, R.R. 2, Mahnomen, Minn. 56557

[21] Appl. No.: 944,455

[22] Filed: Dec. 22, 1986

[51] Int. Cl.⁴ .............................................. B65D 47/20
[52] U.S. Cl. ...................... 222/506; 222/509; 222/518; 222/532; 222/545; 222/559; 222/568; 251/263; 74/527; 74/110; 74/105
[58] Field of Search ............... 222/505, 509, 559, 566, 222/567, 545, , 568, 506, 532, 537, 529, 518; 251/297, 263, 322, 323, 155, 156, 340, 245, 246, 354, 231; 74/527, 110, 105

[56] References Cited

U.S. PATENT DOCUMENTS

| | | | |
|---|---|---|---|
| 442,916 | 12/1890 | Record | 222/566 X |
| 1,405,266 | 1/1922 | Breiel | 222/536 X |
| 1,413,767 | 4/1922 | Nutting | 222/470 X |
| 1,543,827 | 6/1925 | Doty | 251/155 X |
| 2,143,250 | 1/1939 | Ritter | 222/509 X |
| 2,172,142 | 9/1939 | Lebus | 222/509 X |
| 2,275,318 | 3/1942 | Rasmussen | 222/509 X |
| 2,329,716 | 9/1943 | Johnson | 222/568 X |
| 2,524,474 | 10/1950 | Randel | 251/323 X |
| 2,841,313 | 7/1958 | Beall, Jr. | 222/568 X |
| 3,137,417 | 6/1964 | Zetterstrom | 222/568 X |
| 4,031,032 | 6/1977 | Jablecki | 222/460 X |
| 4,050,670 | 9/1977 | Borg et al. | 74/110 X |
| 4,372,467 | 2/1983 | Pritchitt | 251/322 X |
| 4,605,200 | 8/1986 | Huppee | 222/505 |
| 4,712,255 | 12/1987 | Antos et al. | 222/566 X |

Primary Examiner—Michael S. Huppert
Assistant Examiner—Gregory L. Huson
Attorney, Agent, or Firm—James V. Harmon

[57] ABSTRACT

The present invention describes a valved dispensing spout for a fuel can or similar article including an outlet at one end and an inlet at the other end. At the inlet end of the spout is a valve housing having a valve such as a poppet valve slideably mounted therein and yieldably biased to a closed position by means of a spring. The valve is connected to a horizontal plunger via a link and the plunger extends through one wall of the valve housing and is pivoted at its outer end to a valve operating lever which can be moved up or down by finger pressure to open or close the valve.

8 Claims, 1 Drawing Sheet

VALVED DISPENSING SPOUT

FIELD OF THE INVENTION

The present invention relates to dispensing of liquids and more particularly to a valved dispensing spout that can be either permanently or removably mounted upon a fuel can or like article.

BACKGROUND OF THE INVENTION

Gasoline and other fuels as well as lubricants are easily spilled and can, of course, be hazardous. No entirely satisfactory valve device has been available on or in connection with a dispensing spout for such containers. One system in use is the provision of a pivoted cap over the outlet end of the spout. This presents a bad appearance and because of the bulk of the mechanism employed, it is used insofar as is known only as a part of a container having a fixed spout and the cap opening mechanism is itself mounted upon the fuel can. Other problems characterize further attempts to solve these deficiencies. The valve must be substantially leakproof and preferably vaporproof, reliable in operation, rugged in construction and relatively low in cost. It should also be readily adapted and in a preferred form of the present invention is especially suited for use as a replacement spout which can easily be mounted on any of a variety of portable fuel cans or similar receptacles. It can thus be sold in hardware or department stores and sporting goods stores for replacing unvalved spouts now in common use on existing fuel cans and cost little more than a valveless spout. It will thus provide greater safety and reduce the likelihood of fuel spills. It should also help limit overfilling and accidental spillage of fuel during the refilling of lawn mowers, chain saws and other similar items. It should reduce dangerous operating conditions and provide a positive control over the fuel flow from the storage container.

These and other more detailed and specific objects of the present invention will become apparent in view of the following more detailed description and accompanying drawings which illustrate the invention by way of example.

SUMMARY OF THE INVENTION

The invention provides a valved dispensing spout that is preferably removably and replaceably mountable upon a receptacle such as a fuel can. The spout has an outlet at its upper end and an inlet at its lower end where it is connected to the fuel can or other receptacle. A movable flow control valve is mounted movably in the spout. A valve operating member is mounted on the spout and includes a finger engagable pressing surface projecting from one side of the spout for opening the valve when finger pressure is applied to it. A means is provided in the spout for operatively linking the valve operating member with the valve for conveying movement of the finger operating member to the valve to thereby open the valve when finger pressure is applied to the valve operating member. In this way, the fuel can or other receptacle can be lifted as by a handle and tipped to pouring position while finger pressure is simultaneously applied to the valve operating member to open the valve and allow the fluid within the receptacle to be poured from the can while the flow is controlled by the operating member and the closing of the valve will cut off the flow of fluid whenever desired.

THE FIGURES

DETAILED DESCRIPTION

Figures 3, 3A:
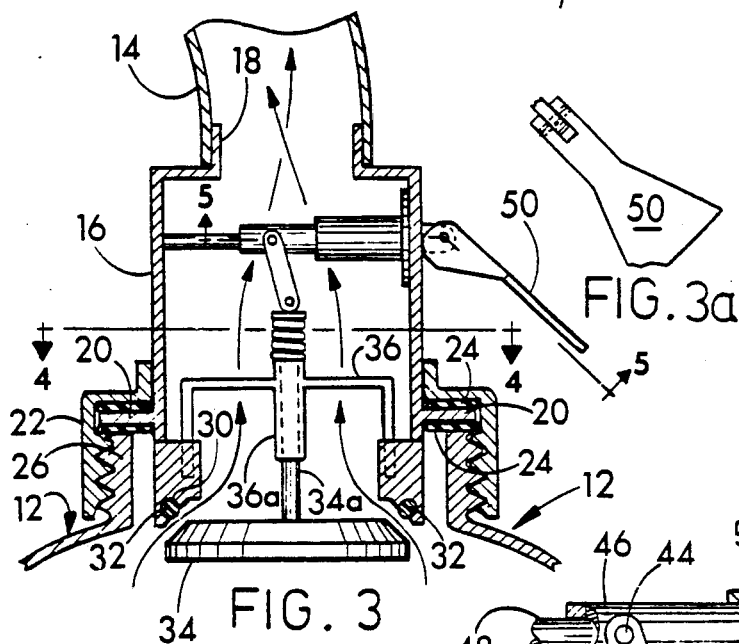
FIG. 3 is a vertical sectional view taken through the lower end of the spout on an enlarged scale.
FIG. 3a is a top view of the valve operating lever shown in FIGS. 1-3.

As shown in the figures, the invention includes a liquid dispensing spout indicated generally by the numeral 10. The spout 10 includes an elongated duct 14 having an outlet opening at the top and an inlet adjacent the bottom end which comprises a valve housing 16 somewhat larger in diameter than the duct 14. The spout is preferably slightly curved as shown and can be secured to the valve housing 16 by means of a friction fit over collar 18 (FIG. 3). The duct 14 can be bonded to the valve housing if desired as by adhesive, welding or soldering, etc. Accordingly, the valve housing functionally comprises the lower portion of the spout.

Figure 1:
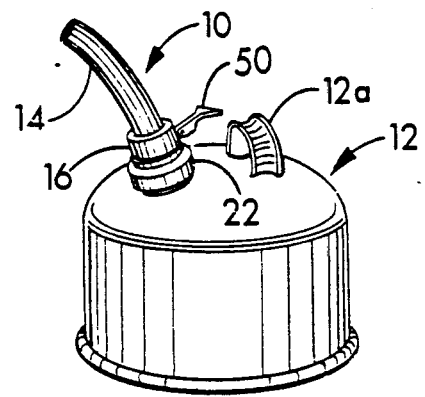
FIG. 1 is a perspective view of a dispensing spout in accordance with the invention mounted upon a fuel can.
Figure 2:
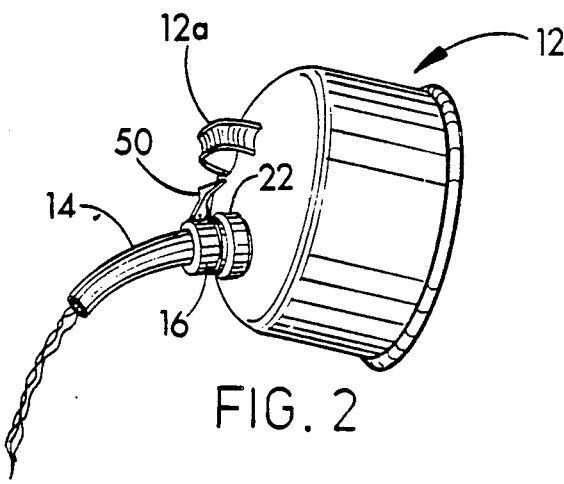
FIG. 2 is similar to FIG. 1 but illustrating the fuel can as fuel is being dispensed.

The spout 10 is mounted upon a receptacle 12 such as a fuel can having a handle 12a. The fuel can 12 is normally positioned upright as shown in FIG. 1 but is tipped as shown in FIG. 2 when fuel is to be dispensed. The fuel can 12 includes the usual threaded neck 26. The spout 10 is held in place upon the neck 26 by means of a horizontally disposed circular flange 20 which rests upon the top of the neck 26 and a threaded collar 22 that extends downwardly over the flange 20 and is threaded to the neck 26. Circular gaskets 24 are provided on the upper and lower surface of the flange 20 to provide a fuel-tight seal. Thus, when the spout is to be mounted on the can 12, the flange 20 is placed on the upper edge of the neck 26 and the collar is threaded onto the neck 26 until a tight seal is formed, preventing any opportunity for leakage.

Figure 4:
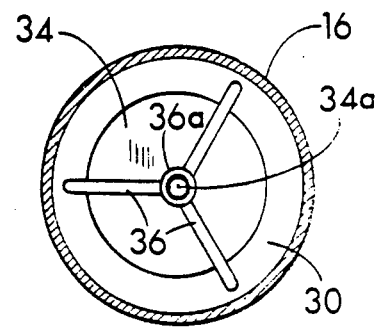
FIG. 4 is a horizontal sectional view taken on line 4—4 of FIG. 3.
Figures 5, 6:
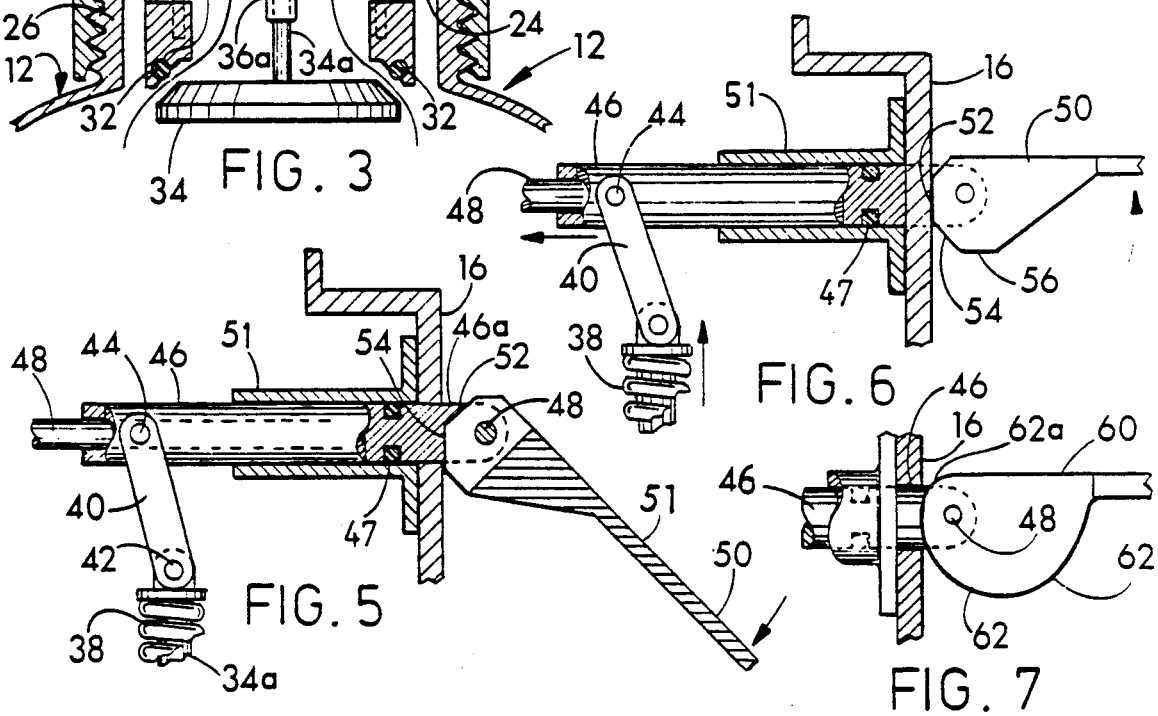
FIG. 5 is a partial enlarged cross-sectional view of the valve operating plunger and link.
FIG. 6 is a view similar to FIG. 5 illustrating the plunger as it appears when the valve is in a closed position and FIG. 7 is a side view of a modified form of valve operating lever.

At the lower end of the valve housing 16 is provided a circular beveled valve seat 30 having an "O" ring 32 such as a rubber "O" ring recessed in its beveled face. Cooperating with the valve seat 30 is a circular valve such as a poppet valve 34 having a circular valve head and a valve stem 34a extending vertically from the valve head and slideably mounted within a valve sleeve 36a of a spider 36 having three diverging arms which are fixedly connected to the inside of the valve housing 16 as shown in FIGS. 3 and 4 to support the valve 34. Connected to the upper end of the valve stem 34a by means of a pivot 42 is a connecting link 40 and between the link 40 and the valve sleeve 36a is a compression spring 38 adapted to yieldably bias the valve 34 in a closed position sealed against the "O" ring 32 of the valve seat 30. The upper end of the connecting link 40 is pivoted at 44 to a laterally slideable plunger 46 that in this instance is tubular and is slideably engaged over a fixed supporting pin 48 attached to the valve housing 16 and within a fixed sleeve 50 secured to the opposite side of the valve housing. A plunger 46 is provided with an "O" ring 47 to make a fuel-tight seal. The right end of the plunger 46a extends outwardly through an opening in the valve housing 16 and is pivotally connected by means of a pivot pin 48 to a valve operating member 50 provided with a finger engagable pressing surface 51. As can be seen, the valve operating member projects from the side of the valve housing and during use functions to open the valve when finger pressure is applied to it. Thus, when the spout 10 is mounted upon the can 12, it can be turned to 360° to position the valve operating member 50 adjacent the handle or facing in the direction of the handle 12a. In FIGS. 5 and 6, it can be seen that the valve operating member 50 is provided with a cam surface at its left end which, in this case, consists of a plurality of connected flat spots 52, 54 and 56, each successively further from the pivot 48 so that, as the valve lever 50 is lowered, each successive flat spot 52, 54 and 56 will draw the plunger 46 further to the right thereby forcing the lower end of the link and the connected valve member 34 downwardly further as each successive flat spot 52–56 engages the wall of the valve housing 16 and the valve operating lever as well as the valve 34 will be held by these flat spots in a fixed position to provide at least one and preferably a plurality of successive valve positions, at each one of which the valve is opened further and is held in each successive open position by the flat spot of the cam surface on the actuating lever 50. When the lever 50 is all the way up to the position of FIG. 6 with the flat spot 52 engaging the housing 16, the valve will be closed. When 54 engages the housing, the valve will be halfway open and when 56 engages the housing 16, the valve will be all the way open. The valve is yieldably urged toward the closed position by the spring 38.

Figure 7:
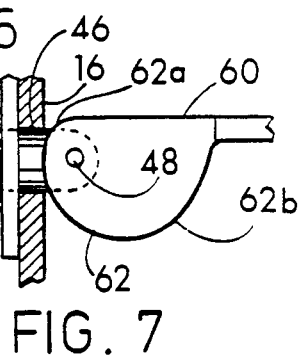

Refer now to FIG. 7 which illustrates a modified form of the invention. Shown in FIG. 7 is a modified form of valve operating lever 60 which includes a spiral cam surface 62 having one end 62a adjacent its upper surface relatively close to the pivot 48 while the opposite end 62b of the cam is relatively far from the pivot 48 with the cam providing a smooth cam surface adapted to withdraw the plunger 46 smoothly and evenly as the valve lever 60 is pressed downwardly by finger pressure. It can be seen that the valve 34 when in the open position will project downwardly into the fuel can 12 thereby maximizing the rapid flow of liquid out through the spout.

Many variations within the scope of the appended claims will be apparent to those skilled in the art once the principles described herein are understood.

What is claimed is:

1. A valve-containing dispensing spout for a fuel can or the like comprising, a spout having an outlet at one end and an inlet at the other end, coupling means at the inlet end for attaching the spout to a fuel receptacle or the like, a movable valve housed in the spout, a valve operating member mounted on the spout, said valve operating member including a finger engagable pressing surface projecting from the side of the valve housing for opening the valve when finger pressure is applied thereto, a connecting link in the spout operatively linking the valve operating member with the valve for conveying movement of the finger operating member to the valve to open the valve when finger pressure is applied to the member, whereby the fuel can or the like can be lifted as by a handle and tipped to pouring position and simultaneously finger pressure applied to the operating member to open the valve to allow fluid to be poured from the can through the spout and the closing of the valve will interrupt the flow of liquid through the spout, the valve operating member comprises an operating lever pivotally mounted upon the spout for movement about a laterally disposed pivot point and is operatively associated with a horizontally disposed plunger mounted for lateral sliding movement within the spout, said connecting link is operatively associated between the plunger and the valve member to move the valve member off its seat when the plunger is slid laterally by the valve operating member, the plunger is mounted slidably within a fixed sleeve supported upon the spout, the valve operating lever is pivotally connected to outwardly extending free end of said plunger, the valve member is a poppet valve yieldably biased toward a closed position and the valve operating member includes a cam in operative engagement with the spout for sliding the plunger within the sleeve as the operating lever is moved upon or down by finger pressure and the lateral sliding motion of the plunger is adapted to transmit motion via the connecting link to the valve member to open the valve, the cam on the valve operating lever is provided with at least once flat spot to hold the operating lever in a selection position with respect to the spout.

2. A removable and replaceable valve dispensing spout to be used as a replacement spout on a fuel can or the like comprising a tubular spout body having an outlet at one end and an inlet at the other end, a valve housing adjacent the inlet end of the spout, said fuel can having a threaded neck thereon, a member on the spout adapted to form a seal upon the neck and said spout being adapted to pivot upon the neck through 360°, a threaded collar engagable upon the threads of the neck for holding the spout in sealing engagement upon the neck, a valve in the housing adapted to move along an axis between open and closed positions for controlling the flow of fuel or other liquid from the can through the spout and a valve operating lever operatively connected to the valve and projecting laterally from the valve housing above the fuel can for moving the valve between open and closed positions whereby the collar can be loosened to allow the spout to be pivoted upon the neck to position the valve operating lever as required to locate the operating lever in a convenient position for the operation thereby by finger pressure while the fuel can is being held manually and is tipped to a fuel dispensing position, operably connected to said valve and a plunger slideably mounted within the housing transverse to the axis of valve movement and includes a free projecting end extending through a side wall of said valve housing, said valve operating lever is pivoted on said plunger and includes a cam surface engagable with said housing for sliding the plunger laterally as the lever is swung about said pivot.

3. The dispensing spout of claim 2 wherein the cam surface includes at least one flat spot adapted to hold the valve in a selected open position.

4. The spout according to claim 3 wherein a plurality of flat spots are provided on said cam surface, each successively at a further distance from said pivot to hold the valve in positions each successively further open than a preceding position.

5. The combination of a can for combustible liquid and a removable replacement spout comprising, a can for liquids with a carrying handle at the top thereof and a neck spaced from the handle for introducing and removing the liquid therefrom, a spout having an outlet duct at one end and a valve housing portion with an inlet at the other end, said inlet having a circular flange thereon adapted to be sealed to the neck of the can, a threaded collar surrounding the flange extending down over the neck and being threaded thereon for sealing the spout to the neck of the can, the neck of the spout and the spout and the flange being circular whereby the spout can be turned on the neck through an angle of 360° about the central axis of the neck of the can, a sealing means between the flange and the neck to prevent leakage of the liquid between the neck and the flange, the outlet duct extending upwardly so as to project above the can when the spout is mounted thereon, a movable valve in the valve housing, movable along an axis between an open and closed position, a valve operating member mounted upon the valve housing and between the duct and the handle, said valve operating member having a free distal end that projects into an open unobstructed area between the handle and the spout and is free from contact with the handle and positioned relative to the handle such that the spout can be rotated on the neck without the operating member striking the handle, said valve operating member being thereby operable by finger pressure when the hand is holding the handle of the can, said valve operating member being operatively associated with a slidable plunger which is transversely mounted in the housing relative to the valve movement axis and which is operably associated with the valve to open the valve when finger pressure is applied to the operating member to force the member downwardly toward the can, whereby said spout can be used to replace a conventional valveless dispensing spout for such a fuel can so that said can may be lifted by the handle, tipped to a pouring position and simultaneously finger pressure applied to he operating member to open the valve to allow fluid to be poured from the can through the spout and the rotation of the spout permitted by loosening the collar can be used to point the spout in a desired direction without the valve operating member striking the handle or other part of the can.

6. The valve of claim 5 wherein said plunger is mounted for sliding movement within the housing and has an exposed portion extending out through the housing, the valve operating member comprises an operating lever pivotally mounted upon the exposed portion of the plunger which is pivotally connected to the operating member and said operating member has a cam surface adjacent the exposed portion of the plunger engaging the housing, a connecting means is operatively associated between the plunger and the valve to move the valve off its seat when the plunger is slid laterally by the valve operating member.

7. The spout of claim 6 wherein the plunger is mounted slidably within a fixed sleeve supported by the housing the valve is a poppet valve yieldably biased toward a closed position and the valve operating member cam surface is in operative engagement with the housing for sliding the plunger within the sleeve as the operating lever is moved up or down by finger pressure and the lateral sliding motion of the plunger is adapted to transmit motion via the connecting means to the valve member to open the valve.

8. The apparatus of claim 6 wherein a spider is provided within the valve housing, a valve sleeve is provided at the center of the spider in alignment with a longitudinal axis of said valve housing, said valve is a poppet valve slideably mounted in the valve sleeve of the spider, a compression spring is operatively associated between said connecting means and the valve sleeve of the spider to yieldably bias the poppet valve toward a closed position in engagement with the valve seat whereby downward pressure on the valve operating member will slide the plunger laterally to open the valve and compress the spring that otherwise normally holds the valve in a closed position.

* * * * *

UNITED STATES PATENT AND TRADEMARK OFFICE
CERTIFICATE OF CORRECTION

PATENT NO. : 4,801,053

DATED : January 31, 1989

INVENTOR(S) : Eugene J. Kaster

It is certified that error appears in the above-identified patent and that said Letters Patent is hereby corrected as shown below:

Column 4, line 51, before "operably" insert -- a plunger --.

Column 4, line 52, delete "a plunger".

Column 6, line 1, "he" should read -- the --.

Column 6, line 22 insert a comma before "the".

Signed and Sealed this

Twenty-sixth Day of September, 1989

Attest:

DONALD J. QUIGG

Attesting Officer

Commissioner of Patents and Trademarks